(12) United States Patent
Pena, III (10) Patent No.: US 9,145,156 B2
(45) Date of Patent: Sep. 29, 2015

(54) SHOPPING CART WEATHER SHIELD

(71) Applicant: Damian Pena, III, Irving, TX (US)

(72) Inventor: Damian Pena, III, Irving, TX (US)

( * ) Notice: Subject to any disclaimer, the term of this patent is extended or adjusted under 35 U.S.C. 154(b) by 0 days.

(21) Appl. No.: 14/056,749

(22) Filed: Oct. 17, 2013

(65) Prior Publication Data

US 2014/0225339 A1 Aug. 14, 2014

Related U.S. Application Data

(60) Provisional application No. 61/850,176, filed on Feb. 11, 2013.

(51) Int. Cl.
*B62B 5/00* (2006.01)
*B62B 3/14* (2006.01)

(52) U.S. Cl.
CPC ............. *B62B 5/0013* (2013.01); *B62B 3/1436* (2013.01)

(58) Field of Classification Search
CPC .................. B62B 3/14; B62B 3/1408–3/1424; B62B 3/1436
USPC ...................................... 280/33.992
See application file for complete search history.

(56) References Cited

U.S. PATENT DOCUMENTS

| | | | |
|---|---|---|---|
| 1,173,881 A * | 2/1916 | *** | .............................. 296/114 |
| 3,534,973 A * | 10/1970 | ***Mengo | ............... 280/33.992 |
| 5,836,332 A * | 11/1998 | Mick | .............................. 135/124 |
| 7,219,901 B2 * | 5/2007 | Ryan | ........................ 280/33.992 |
| 2006/0175778 A1 | 8/2006 | Rose et al. | |
| 2008/0258528 A1 | 10/2008 | Bush et al. | |

* cited by examiner

*Primary Examiner* — Jeffrey J Restifo
*Assistant Examiner* — Erez Gurari (57) ABSTRACT

A shopping cart cover for providing protection to a user and contents of a shopping cart during inclement weather conditions, such as rain or snow, or providing shade against the sun. The cover includes four legs that can collapse or expand and attach to the cart using one or more fastening members. In addition, the configuration of the roof of the cover allows a plurality of covers to be stacked on top of each other.

11 Claims, 10 Drawing Sheets

SHOPPING CART WEATHER SHIELD

CROSS REFERENCE TO RELATED APPLICATIONS

This application claims the benefit of U.S. Provisional Application No. 61/850,176 filed on Feb. 11, 2013, which is incorporated herein by reference in its entirety

FIELD OF THE INVENTION

This disclosure relates to a shopping cart cover, and, more specifically, to an apparatus and method to protect a shopper and items in a shopping cart from inclement weather.

BACKGROUND

This section is intended to introduce the reader to aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Inclement weather is a great inconvenience to a shopper. Rain, snow, and/or sleet saturate purchased goods contained in a shopping cart and also the shopper or consumer pushing the cart. Often times during inclement weather, such as rain, snow and/or sleet, the purchased items in the shopping cart are exposed to the environment such that the rain may fall directly on the items and the shopper. When the distance that the consumer travels from the retail store to the consumer's vehicle is substantial, it is often times the result that the goods in the shopping cart and the person pushing the shopping cart become wet and even saturated by the falling rain. Such goods, even if bagged, may be destroyed if contacted by a sufficient amount of rain. In addition, the rain or inclement weather deters the consumer from going to the merchant or retail venue, particularly if it is an outdoor venue, knowing that he or she may be exposed by the rain or inclement weather. This potentially prevents and/or reduces a merchant's revenue and sales due to inclement weather conditions.

As an additional nonlimiting example, mothers transporting children in addition to the goods in the shopping cart typically will attend to the safety and security of their children prior to unloading the goods from the shopping cart. While the mother is attending to the safety of her children, the goods and child in the shopping cart are exposed to rain for an extended time, which increases the likelihood that some goods may be saturated and/or ruined and the child becoming irritated and exposed to the elements, increasing their likelihood of becoming sick. Therefore, a need exists to address the aforementioned deficiencies and shortcomings described above.

BRIEF SUMMARY OF THE INVENTION

The shopping cart cover, or shopping cart weather shield of the present invention addresses the aforementioned shortfalls of prior attempted devices and the need for a cover that protects the consumer and contents of a shopping cart during inclement weather conditions, such as rain, snow, or as a shade against the sun. Particularly, the shopping cart cover of the present is simple to set up or assemble, lightweight, and cost effective to manufacturer. Further, the shopping cart cover of the present invention provides retailers a method of protecting their customers from inclement weather conditions, thus improving customer relations and the likelihood of shoppers visiting their establishment during inclement weather conditions.

In one aspect of the invention, a shopping cart cover is provided having a roof, at least two supports coupled to the roof, and wherein the support beams are configured to couple to a component of the shopping cart. In addition, the component can be the basket of the shopping cart. Alternatively, the component can be the frame of the shopping cart. The supports of the shopping cart cover are substantially upright. In addition, the supports pivot with respect to the roof. The supports can be configured to fold in a collapsed position underneath the roof. Also, one or more fasteners can couple the supports to the basket of the shopping cart.

In another aspect of the invention, a shopping cart cover is provided having a roof, a first and second substantially upstanding legs, wherein the first and second legs couple to the roof, and wherein the first and second legs further couple to an area of a shopping cart. In addition, the shopping cart cover further comprises a third and fourth substantially upstanding legs that further couple to the roof and to an area of the shopping cart. The aforementioned area can be a basket of the shopping cart. Further, the basket can be comprised of an interwoven mesh pattern having a plurality of openings. Here, the first and second legs are secured to the basket by one or more fasteners. The fasteners can engage the first and second legs through one or more openings of the interwoven pattern of the basket. Also, the one or more fasteners engage the first and second legs via a threaded engagement.

In another aspect of the invention, a method of coupling a cover to a mobile cart is provided. The method includes unfolding a first and second support coupled to the underside surface of the cover into to an upright extended position, wherein the supports are substantially perpendicular with respect to the cover, and coupling the first support to a first area of the cart, and coupling the second support to a second area of the cart. In addition, the method can further include unfolding a third and fourth support coupled to the underside surface of the cover into an upright extended position, wherein the supports are substantially perpendicular with respect to the cover, and coupling the third support to a third area of the cart, and coupling the fourth support to a fourth area of the cart.

The above summary is not intended to describe each and every disclosed embodiment or every implementation of the disclosure. The Description that follows more particularly exemplifies the various illustrative embodiments.

BRIEF DESCRIPTION OF THE DRAWINGS

The following description should be read with reference to the drawings, in which like elements in different drawings are numbered in like fashion. The drawings, which are not necessarily to scale, depict selected embodiments and are not intended to limit the scope of the disclosure. The disclosure may be more completely understood in consideration of the following detailed description of various embodiments in connection with the accompanying drawings, in which.

DETAILED DESCRIPTION

In the Summary of the Invention above and in the Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally. The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also one or more other components. Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose lower limit is the first number and whose upper limit is the second number. For example, 25 to 100 mm means a range whose lower limit is 25 mm, and whose upper limit is 100 mm.

The embodiments set forth below represent the necessary information to enable those skilled in the art to practice the invention and illustrate the best mode of practicing the invention. In addition, the invention does not require that all the advantageous features and all the advantages need to be incorporated into every embodiment of the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Terms and phrases similar to "shopper", "consumer", or "user" can be any person using pushing a shopping cart to move items from one location to another or assembling the cart cover or using the shopping cart or cart cover.

Terms and phrases similar to "environmental conditions" can be any type of weather related condition, including but not limited to rain, snow, sleet, dust, or sun.

Figure 1:
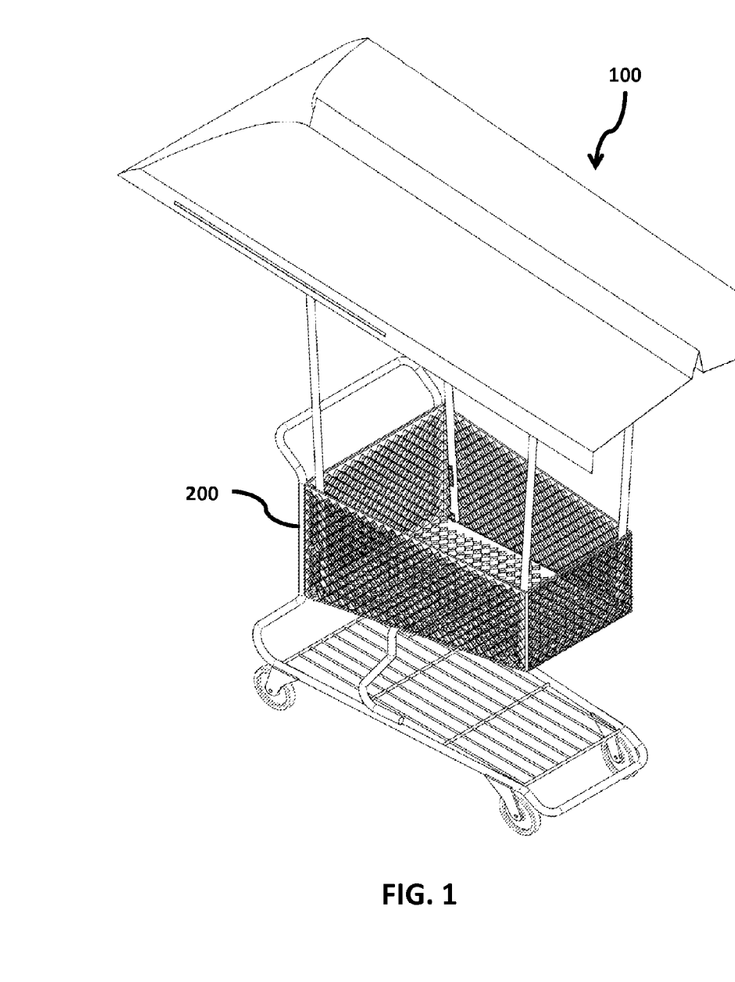
FIG. 1 illustrates a perspective view of one embodiment of a shopping cart cover as attached to a shopping cart.
Figure 2:
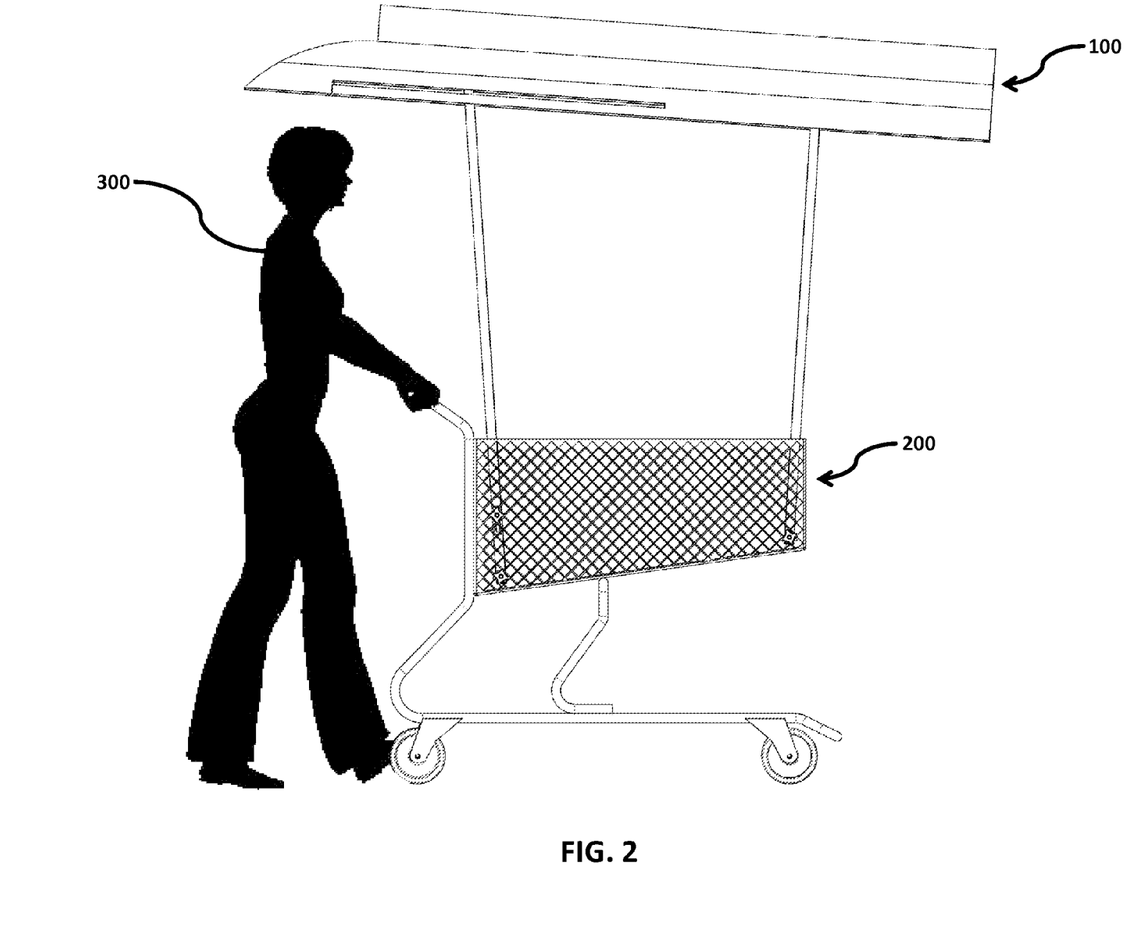
FIG. 2 illustrates a side view of the shopping cart cover, further illustrating a consumer pushing the shopping cart while being covered overhead by the shopping cart cover.

FIG. 1 illustrates in one non-limiting embodiment, the shopping cart cover of the present document. In particular, the shopping cart cover 100 is shown attached or coupled to the basket or frame of shopping cart 200. FIG. 2 further illustrates a user 300 being covered by the cover 100 while he or she is pushing cart 200. Here, it can be seen that cover 100 substantially covers the head and body of user 300 and the contents (not shown) of shopping cart 200, thereby substantially reducing or eliminating both the user 300 and cart 200 from becoming exposed to rain or other environmental conditions, such as rain, snow, sleet, or the sun.

Figure 3:
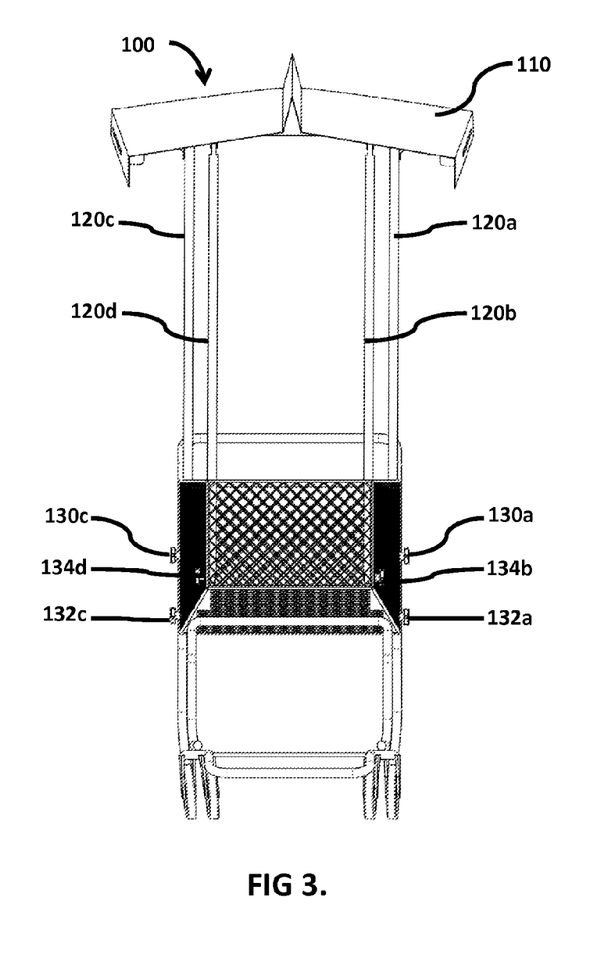
FIG. 3 illustrates a front view of the shopping cart cover as attached to the shopping cart.
Figure 4:
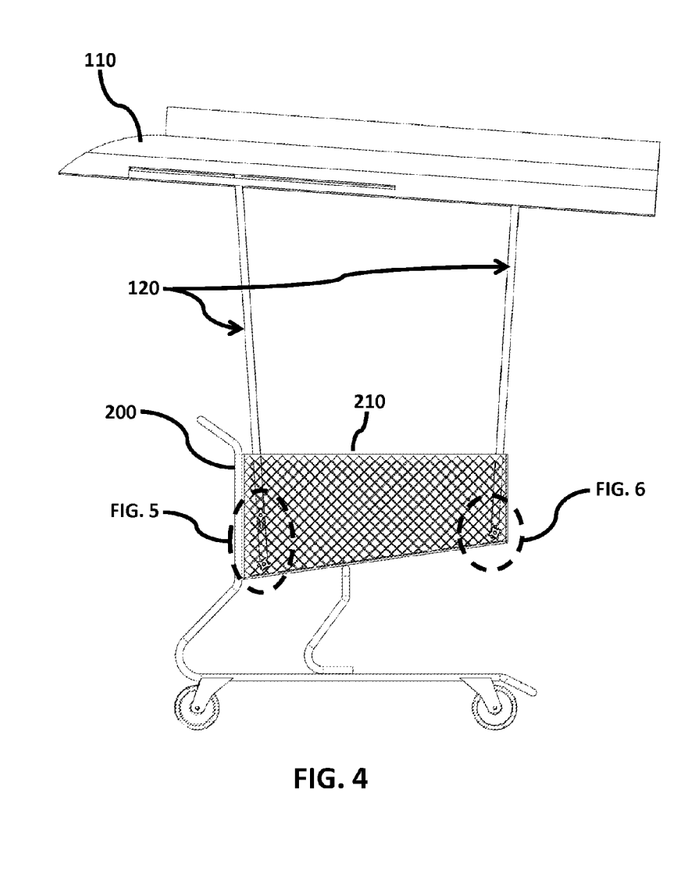
FIG. 4 illustrates a side view of the shopping cart cover as attached to the shopping cart.
Figure 10:
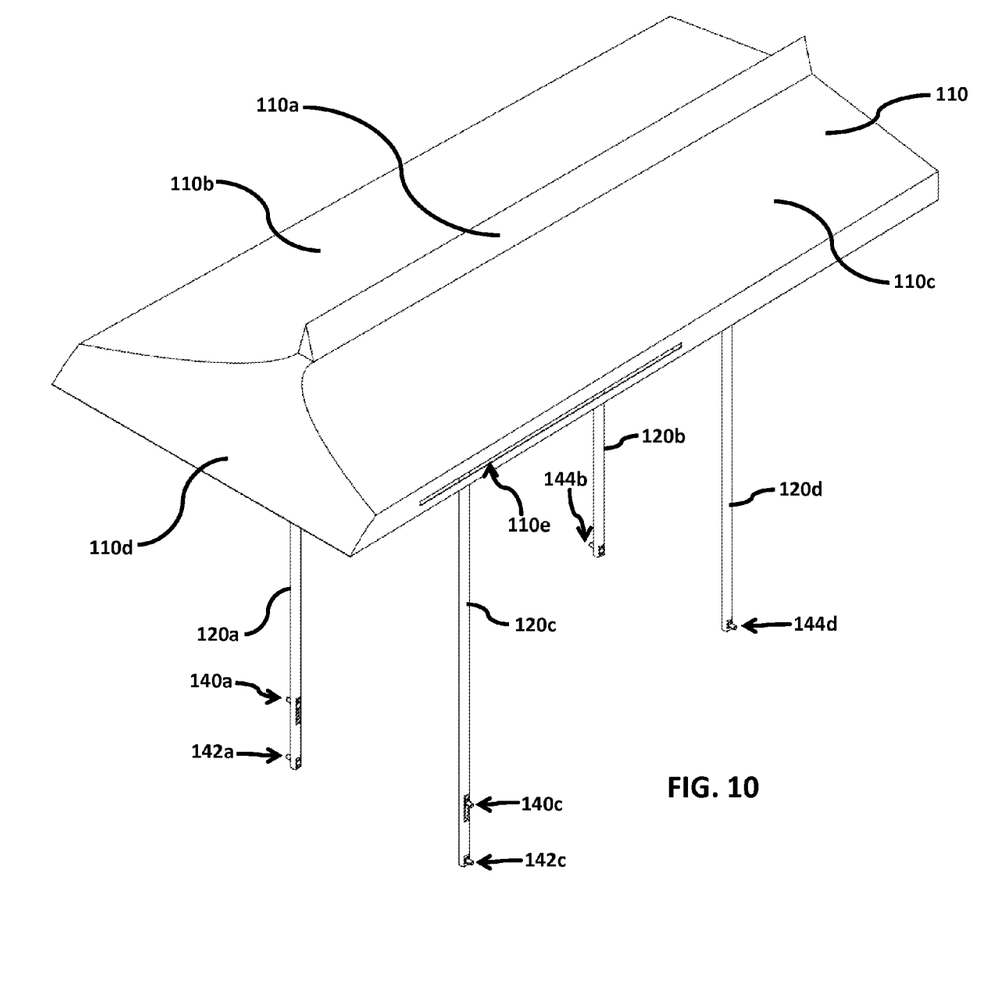
FIG. 10 illustrates a perspective top view of the shopping cart cover with all four in a fully extended position.

Referring to FIGS. 3-4, and FIG. 10, cover 100 is shown having a main roof 110 and legs 120. Further, legs 120, which can also be referred to herein as supports, beams, support beams, or rods, are comprised of back legs 120a and 120c and front legs 120b and 120d. Legs 120b and 120d can be slightly shorter in length than legs 120a and 120c. In addition, back leg 120a has two openings that receive fastening members 130a and 132a, and back leg 120c has two openings that receive fastening members 130c and 132c. Further, front leg 120d has one opening that receives fastening member 134d and front leg 120b has one opening that receives fastening member 134b. It is contemplated within the scope of the invention that either of legs 120a-d can also be telescoping legs or have a telescoping feature.

Figure 5:
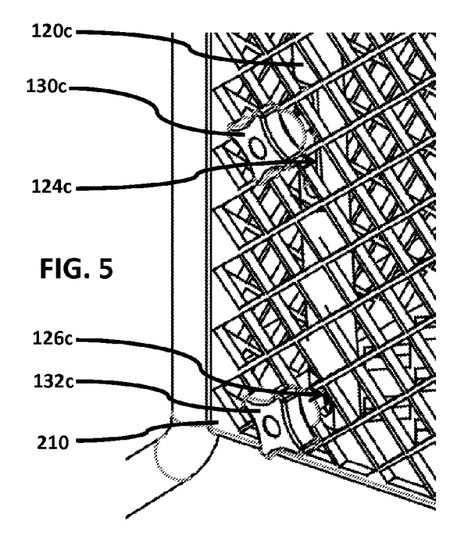
FIG. 5 illustrates a close-up perspective view of the back knobs for coupling to the back legs of the shopping cart cover to the shopping cart basket.
Figure 6:
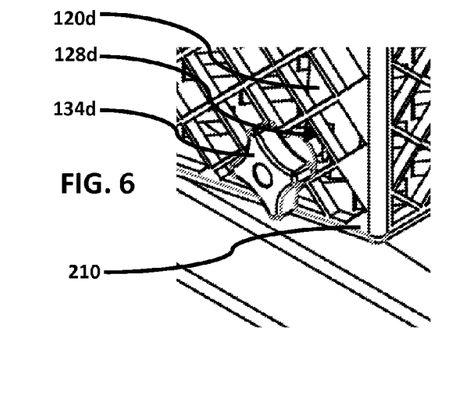
FIG. 6 illustrates a close-up perspective view of the front knob for coupling the front legs of the shopping cart cover to the shopping cart basket.

FIG. 5 and FIG. 6 illustrate close-up perspective views of the attachment areas encircled in FIG. 4. Specifically, once a user has fully extended legs 120a-d of cover 100, the legs are placed inside the basket 210 of cart 200. Particularly, fastening members secure the legs to basket 210 through the interweaved or meshed configuration of basket 210. FIG. 5 illustrates a clos-up view of connection area encircled in FIG. 4 for the back legs of the cover. Here, FIG. 5 illustrates back leg 120c and it is contemplated within the scope of the invention that leg 120a and its associated parts, including its openings and corresponding fastening members, are a mirror image of back leg 120c and wherein the following discussion and embodiments as it relates to leg 120c can also be applicable to leg 120a. Here, leg 120c is shown having openings 124c and 126c that receive corresponding fastening members 130c and 132c, respectively. Here, either or both of openings 124c and 126 can be threaded and the shaft of fastening members 130c and 132c can also be threaded, wherein the fastening members are rotated clockwise to securely tighten and engage the interior of the openings, thereby securely coupling the legs of the cover to the basket 210 of the cart 200. It is contemplated within the scope of the invention that the back legs can also be secured to outside or outer area of the basket of the shopping cart, and not within the basket.

FIG. 6 illustrates a close-up view of the encircled connection area in FIG. 4 for the front legs of the cover. Here, FIG. 6 illustrates leg 120d and it is contemplated within the scope of the invention that leg 120b and its associated parts, including its openings and corresponding fastening members, are a mirror image of front leg 120d and wherein the foregoing discussion and embodiments as it related to leg 120d can also be applicable to leg 120b. Here, leg 120d is shown having opening 128d that receive corresponding fastening member 134d. Here, opening 128d can be threaded and the shaft of fastening member 134d can be also be threaded, wherein the fastening members are rotated clockwise to securely tighten and engage the interior of the openings, thereby securely coupling the legs of the cover to the basket 210 of the cart 200. It is contemplated within the scope of the invention that the front legs can also be attached the outside or outer area of the basket of the shopping cart, and not within the basket.

In the foregoing discussion, fasteners 130c, 132c, and 134c, are shown as a knob-like structure having a threaded shaft that engages the threads of the openings wherein the fasteners are tightened with respect to the openings of each leg of the cover. However, it is contemplated within the scope of the invention that the fastening members can include but are not limited to be any type of nut, bolt, clamp, clasp, strap, VELCRO®, buckle, or adhesives. Further, it is contemplated within the scope of the invention, that in addition to or in lieu of the openings on either of legs 120a-120d, the legs may have their own fastening means, wherein the means include but are not limited to nut, bolt, hook, spring, biases, clamp, clasp, strap, quick-release, VELCRO®, buckle, or adhesives.

For example, FIG. 10 illustrates another embodiment for fastening members. Here, fastening members 140a-d, 142a-d, and 144a-d provide an alternative method for securing the legs 120a-d to the basket of the cart. Here, fastening members 140a-d, 142a-d, and 144a-d are extended protrusions that hook on to or couple to the openings within the mesh frame of the basket of the cart, thereby securing the legs of the cover to the cart. Alternatively, fasteners 140a-d, 142a-d, and 144a-d may be either male or female threaded members shafts that couple with a knob like threaded nut, bolt, or screw.

Figure 7:
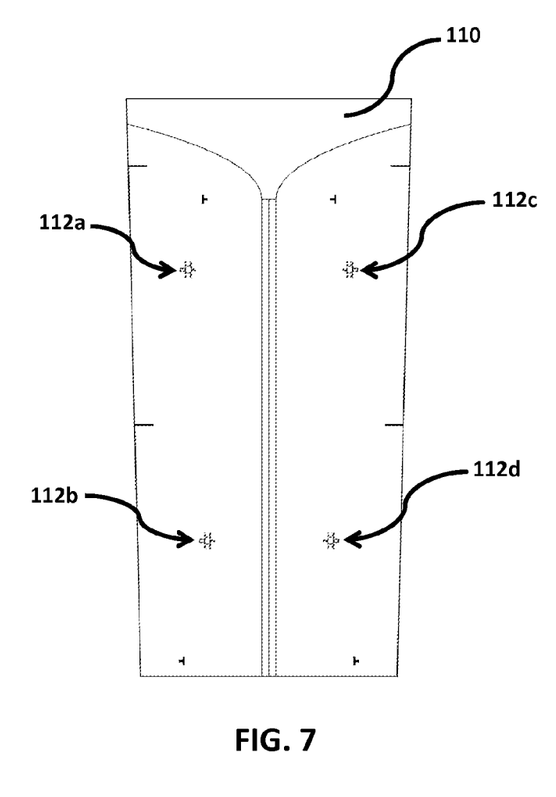
FIG. 7 illustrates an underside view of the shopping cart cover with all four legs in a fully extended position.
Figure 8:
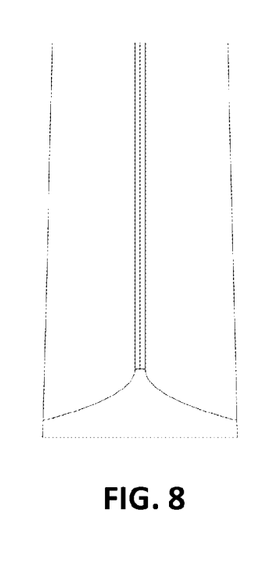
FIG. 8 illustrates a top view of the shopping cart cover.
Figure 9:
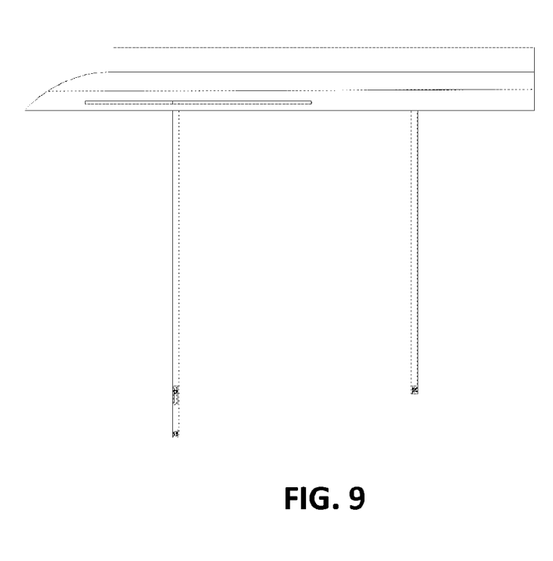
FIG. 9 illustrates a side view of the shopping cart cover with all four legs in a fully extended position.

FIGS. 5-20 illustrate in greater detail the various parts and components of cover 100 of the present document. Referring to FIG. 7, roof 110 of cover 100 is shown having connection anchor points 112a, 112b, 112c, and 112d. Here, anchor points 112a, 112b, 112c, and 112d provide a base and pivoting foundation attachment points for each of legs 120a, 120b, 120c, and 120d. Particularly points 112a-d allow legs 120a-d to pivot into either a folded or collapsed stowed position, as shown in FIGS. 11-14, or in an open or fully extended position in a substantially 90 degree angle with respect to the roof 110, as shown in FIGS. 7, 9, and 10. The folded position of the legs allow a plurality of covers to be stacked on top of each other. Further, points 112a-d may each provide a stop that prevents the legs from extending more than a 90 degree angle with respect to the roof. However, it is contemplated within the scope of the invention that 120a-d may open at any angle and may have or not have a stopping device. In addition, anchor points 112a-d may be fixed to legs 120a-d without pivoting function or points 112a-d can provide a quick release or quick attachment configuration for legs 120a-d.

Referring to FIG. 10, roof 110 of cover 100 is an "A" like type of roof configuration that allows environmental conditions, such as rain to easily and quickly run off the surface of the roof. Particularly, roof 110 includes a peak area 110a and downward sloping areas 110b, 110c, and 110d. Further, when the cover is coupled to the cart, the roof has a slightly downward angle with respect to the ground, as shown in FIG. 4. In addition, the roof 110 includes extended slot opening 110e to provide better air ventilation within the cover. Here, in FIG. 4, roof 110 is shown with slot 110e on the right side of the cover, however, it is contemplated within the scope of the invention that the left side of the cover can have an identical slot, similar to slot 110e. In addition, the cover can have indicia, markings, lights (such as LED), or graphics on or around its surface area, such as its right, front, back, or left sides, or areas 110a-d. Further, the cover can be molded or shaped to resemble a car, racecar, motorcycle, vehicle, or any type of animal.

Figure 11:
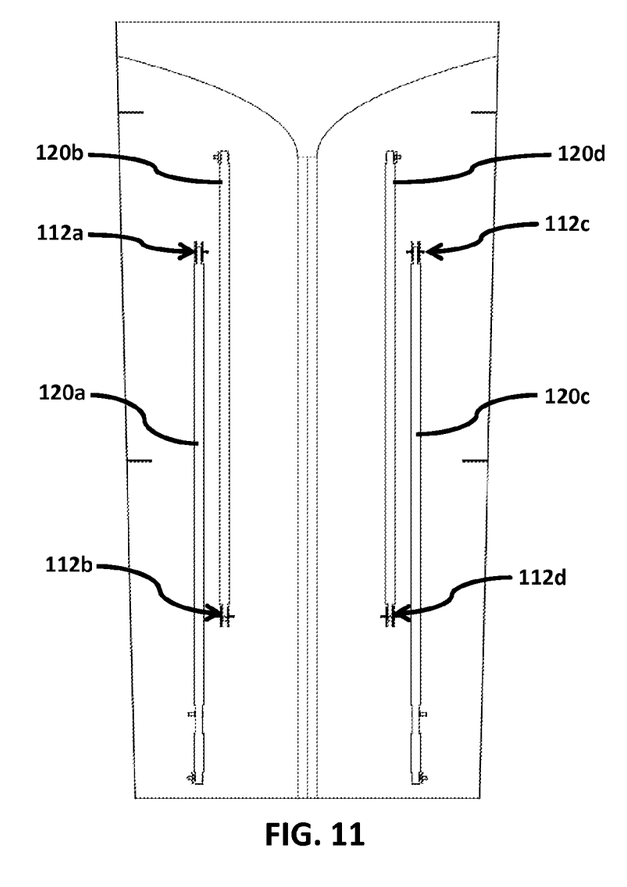
FIG. 11 illustrates an underside view of the shopping cart cover with all four legs in a fully collapsed position.
Figure 12:
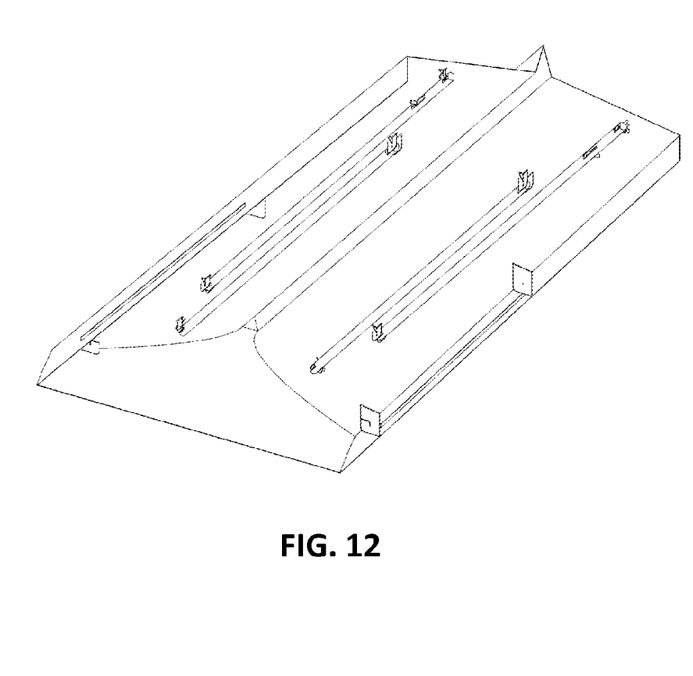
FIG. 12 illustrates an underside perspective view of the shopping cart cover with all four legs in a fully collapsed position.
Figure 13:
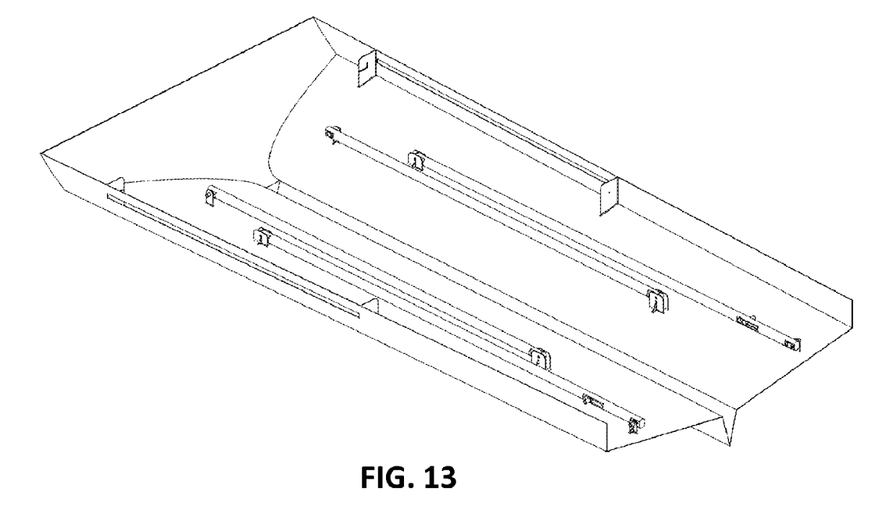
FIG. 13 illustrates another underside perspective view of the shopping cart cover with all four legs in a fully collapsed position.
Figure 14:
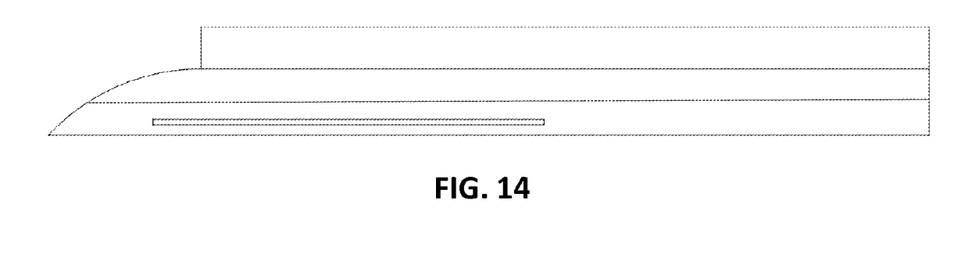
FIG. 14 illustrates a side view of the shopping cart cover with all four legs in a fully collapsed position.
Figure 15:
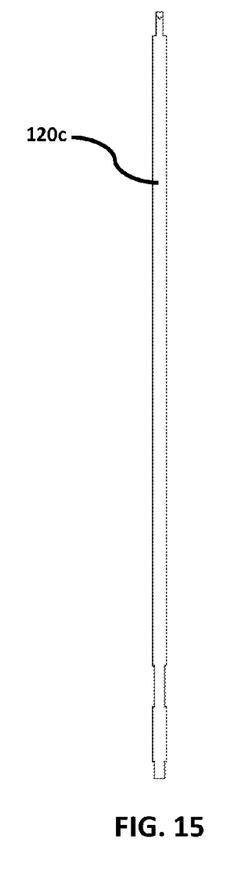
FIG. 15 illustrates a side view of one of the back legs of the shopping cart cover.
Figure 16:
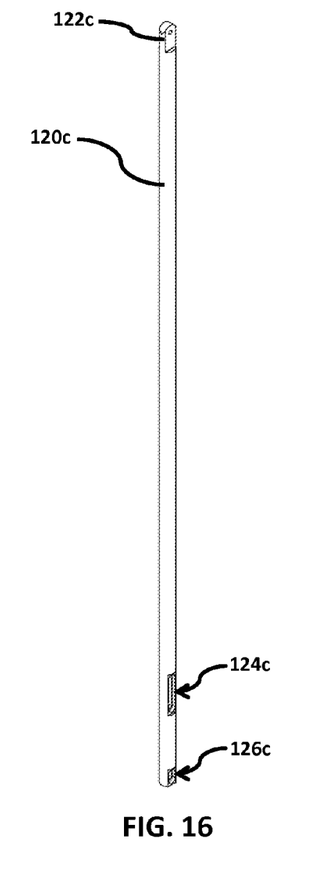
FIG. 16 illustrates a perspective view of one of the back legs of the shopping cart cover.
Figure 17:
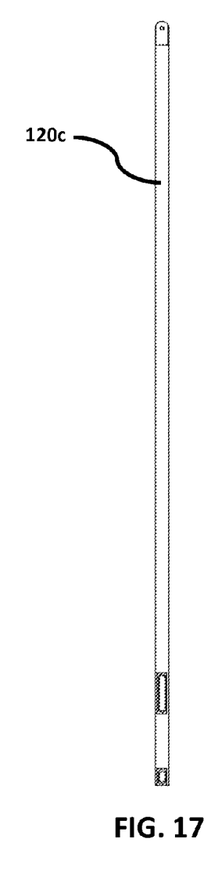
FIG. 17 illustrates a front view of one of the back legs of the shopping cart cover.

FIGS. 15-17 illustrate a close up view of back leg 120c, wherein back leg 120a is identical in configuration to leg 120c and wherein the following discussion and various modifications can also be applicable to leg 120a. Here, leg 120c is substantially tubular or cylindrical and includes an attachment point 122c that allows for a pivoting connection to anchor point 112c (FIG. 11). In addition, leg 120c is shown having openings 124c and 126c, wherein the opening 124c is slightly longer in length than opening 126. The slightly longer opening 124c provides enough opening so that the one of the apertures or openings within the interwoven mesh of the cart basket can align with opening 124c, thereby allowing a fastening member to feed through the opening of the basket and into openings 124c and 126c to securely couple the leg to the cart. However, it is contemplated within the scope of the invention that either of openings 124c or 126c can be of any length or configuration. In addition, there may be one opening or three or more openings along the leg.

Figure 18:
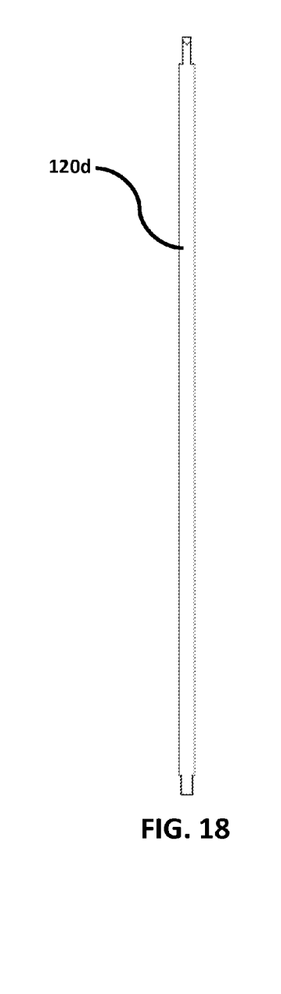
FIG. 18 illustrates a side view of one of the front legs of the shopping cart cover.
Figure 19:
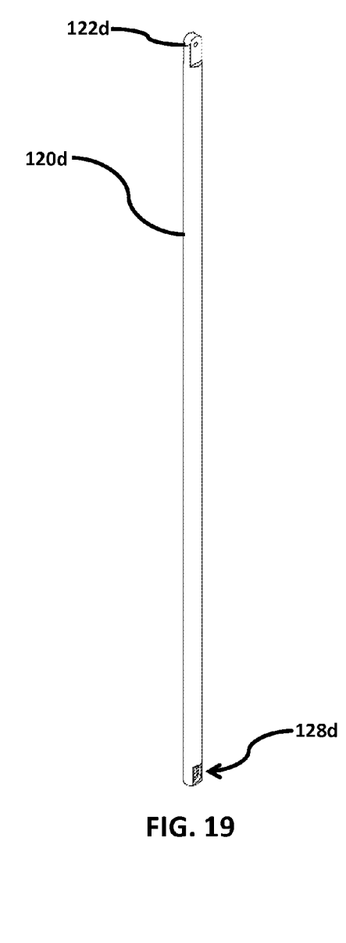
FIG. 19 illustrates a perspective view of one of the front legs of the shopping cart cover.
Figure 20:
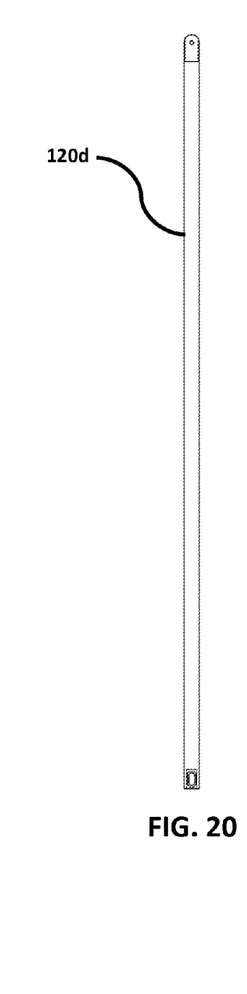
FIG. 20 illustrates a front view of one of the front legs of the shopping cart cover.

FIGS. 18-20 illustrate a close up view of front leg 120d, wherein front leg 120b is identical in configuration to leg 120d and wherein the following discussion and various modifications can also be applicable to leg 120b. Here, leg 120d is substantially tubular or cylindrical and includes an attachment point 122d that allows for a pivoting connection to anchor point 112d (FIG. 11). In addition, leg 120d is shown having opening 128d that allows a fastening member to securely engage the opening, thereby securely coupling the leg to the basket of the cover. Here, in operation, opening 128d will be aligned with an opening within the interwoven basket, thereby allowing a fastening member to feed through the opening of the basket and into opening 128d, thereby securely coupling the leg to the cart.

It is contemplated within the scope of the invention that the cover, including the roof and legs, can be made of any suitable material. For example, these materials can include but are not limited to plastic, polycarbonate derived, fiberglass, metal, steel, cardboard, paper derived, wood, polyurethane, vinyl, or fabric. Further, any type of manufacturing method can be used to produce the cart cover, such as molding, blow molding, injection molding, extrusion molding, foam molding, laminating, and thermoforming.

From the foregoing it will be seen that this invention is one well adapted to attain all ends and objectives herein-above set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts described herein, except insofar as such limitations are included in the following claims. For example, it is contemplated within the scope of the invention that the cover and its legs may be attached to the frame or metal frame of the shopping cart and not the basket. Or alternatively, the cover and legs being attached to both the frame and basket. Further, the shopping cart cover and legs can be pre-assembled on to the shopping cart or assembled on location by a user, such as at a retailer's location. Further, it will be understood that certain features and sub-combinations are of utility and may be employed without reference to other features and sub-combinations.

What is claimed is:

1. A shopping cart cover, comprising:
   an overhead roof, wherein the roof's surface area is substantially covered,
   at least two vertical elongated support members coupled to the overhead roof, wherein the support members are configured to couple to one or more areas of a shopping cart,
   wherein the shopping cart comprises a meshed basket having a front end and rear end, and a handle bar at the rear end;
   wherein at least one of the vertical support members further comprises an elongated protrusion,
   wherein a distal end of the protrusion extends through an opening of an interwoven region of the meshed basket, and wherein the distal end of the protrusion is coupled to a fastener, wherein the fastener secures the at least one vertical support member to the meshed basket;
   wherein a front end of the roof extends beyond the front end of the basket, a rear end extends beyond the handle bar at the rear end of the basket, a left side of the roof extends beyond a left side of the basket, and a right side of the roof extends beyond a right side of the basket;
   wherein the roof is spaced apart and elevated above the basket; and
   wherein the overhead roof is configured to at least partially cover a user behind the shopping cart.

2. The shopping cart cover of claim 1, wherein the supports pivot with respect to the roof.

3. The shopping cart cover of claim 1, wherein the supports are configured to fold in a collapsed position underneath the roof.

4. The shopping cart cover of claim 1, wherein one or more fasteners couple the supports to the component of the shopping cart.

5. The shopping cart cover of claim 1, wherein a plurality of shopping cart covers can be stacked on top of each other.

6. A shopping cart cover, comprising:
   an overhead covered roof;
   a first and second substantially upright vertical legs, wherein the first and second legs are coupled to the roof;
   wherein the first and second legs further couple to one or more areas of a shopping cart; and
   wherein the shopping cart comprises a meshed basket having a front end and rear end, and a handle bar at the rear end;
   wherein at least one of the legs further comprises an elongated protrusion, wherein a distal end of the protrusion extends through an opening of an interwoven region of the meshed basket, and
   wherein the distal end of the protrusion is coupled to a fastener, wherein the fastener secures the at least one leg to the meshed basket;
   wherein a front end of the roof extends beyond the front end of the basket and a rear end extends beyond the handle bar at the rear end of the basket, a left side of the roof extends beyond a left side of the basket, and a right side of the roof extends beyond a right side of the basket;
   wherein the first and second legs elevate the roof above the basket; and
   wherein one end of the overhead roof is configured to at least partially cover a user behind the shopping cart.

7. The shopping cart cover of claim 6, wherein the cart cover further comprises a third and fourth substantially upstanding legs that further couple to the roof and to an area of the shopping cart.

8. The shopping cart cover of claim 6, wherein the basket is comprised of an interwoven mesh pattern having a plurality of openings.

9. The shopping cart cover of claim 6, wherein the roof can include one or more of the following on its outer surface: indicia, graphics, artwork, or lighting.

10. The shopping cart cover of claim 6, wherein the fastener engages the at least one leg via a threaded engagement.

11. A method of coupling the shopping cart cover of claim 1, the method comprising:
   unfolding the supports from the underside surface of the overhead roof cover into to an upright vertical extended position, wherein the supports are substantially perpendicular with respect to the roof cover; and
   coupling the supports to the one or more areas of the cart.

* * * * *